United States Patent
Shupak et al.

(10) Patent No.: US 8,028,148 B2
(45) Date of Patent: Sep. 27, 2011

(54) SAFE AND EFFICIENT ALLOCATION OF MEMORY

(75) Inventors: Richard Shupak, Kirkland, WA (US); Landy Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 753 days.

(21) Appl. No.: 11/517,864

(22) Filed: Sep. 6, 2006

(65) Prior Publication Data

US 2008/0126742 A1    May 29, 2008

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)

(52) U.S. Cl. ......... 711/217; 711/165; 711/220; 711/221
(58) Field of Classification Search ................... 711/217
See application file for complete search history.

(56) References Cited

U.S. PATENT DOCUMENTS

| | | | | |
|---|---|---|---|---|
| 5,123,045 | A * | 6/1992 | Ostrovsky et al. | 713/190 |
| 6,216,175 | B1 * | 4/2001 | Sliger et al. | 717/169 |
| 6,230,316 | B1 * | 5/2001 | Nachenberg | 717/169 |
| 6,553,486 | B1 * | 4/2003 | Ansari | 712/222 |
| 6,745,306 | B1 * | 6/2004 | Willman et al. | 711/163 |
| 6,802,006 | B1 * | 10/2004 | Bodrov | 713/187 |
| 6,978,018 | B2 * | 12/2005 | Zimmer | 380/30 |
| 7,546,430 | B1 * | 6/2009 | Miller et al. | 711/163 |
| 7,571,199 | B1 * | 8/2009 | Field et al. | 708/250 |
| 2003/0084433 | A1 * | 5/2003 | Luk et al. | 717/158 |
| 2004/0162930 | A1 * | 8/2004 | Forin et al. | 711/1 |
| 2008/0016314 | A1 * | 1/2008 | Li et al. | 711/200 |
| 2008/0028180 | A1 * | 1/2008 | Newman et al. | 711/206 |

OTHER PUBLICATIONS

Shacham et al, "On the Effectiveness of Address-Space Randomization", Oct. 25-29, 2004.*

* cited by examiner

Primary Examiner — Brian Peugh
Assistant Examiner — Prasith Thammavong (57) ABSTRACT

Aspects of the present invention are directed at centrally managing the allocation of memory to executable images in a way that inhibits malware from identifying the location of the executable image. Moreover, performance improvements are implemented over traditional systems that enable relative addressed instruction to be resolved at runtime. In this regard, a method is provided that identifies a randomized location to load the executable image into a memory address space. Then, data that may be used to resolve the relative addressed instruction is loaded and maintained in memory. At runtime when pages that store relative addressed instructions are accessed, an arithmetic operation is performed to resolve the relative addressed instruction. As a result, only those relative addressed instructions on pages accessed during program execution are resolved.

18 Claims, 5 Drawing Sheets

SAFE AND EFFICIENT ALLOCATION OF MEMORY

BACKGROUND

In modern computers, an operating system kernel is responsible for making data available to a central processing unit ("CPU"). In this regard, when a program is scheduled for execution, the kernel causes data that implements the program to be loaded from a mass storage device (e.g., hard drive) into memory that is readily accessible to the CPU. To abstract the complexities of reading and writing data from memory, the operating system implements a virtual memory address space. Using the virtual memory address space, data that implements program functionality may be referenced and retrieved in a standardized way regardless of which input/output ("I/O") device stores the data.

The memory management functionality implemented by the operating system has been a contributing factor in making a computer vulnerable to malware. For example, data that implements program functionality may be loaded into common locations (e.g., memory addresses) on computers that execute the same versions of an operating system or other programs. In an exploit commonly known as a buffer overflow, a malware author identifies an existing operation that copies data to a buffer in memory. In this type of exploit, a limited segment of memory is allocated to the buffer and a check to determine whether the allocated area of memory is sufficient to complete an operation was not performed. As a result, the malware causes excess information to overwrite data at a known location in memory that, for example, may be used to store a privileged software component. In this way, the malware is able to redirect program execution to program code associated with the malware without triggering a scan by anti-virus software. When a computer malware gains control of a computer using this type of attack, the potential damage to the computer is substantial as the process corrupted by the malware may be highly trusted, running with system and/or administrator privileges. As a result, the malware will inherit the same trust level as the process that was corrupted.

To prevent the address space that stores a software component from being identified, various techniques have been proposed. In one technique, software components are randomly assigned a memory address space so that different locations in memory are used each time the software component is executed. As a result, malware authors may be unable to identify the memory location allocated to the software component that the malware is designed to exploit. However, the memory address space available to programs is a finite resource. A mere random assignment of address spaces results in memory being fragmented. As a result, implementing memory management schemas that are designed to prevent malware authors from being able to identify the memory address space allocated to particular software components have had a negative impact on system performance.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the present invention are directed at centrally managing the allocation of memory to executable images in a way that inhibits malware. Moreover, performance improvements are implemented over existing systems that enable relative addressed instruction to be resolved at runtime. In this regard, a method is provided that identifies a randomized location to load an executable image into a memory address space. Then, data that may be used to resolve the relative addressed instruction is copied and remains resident in memory. At runtime when pages that store relative addressed instructions are loaded, an arithmetic operation to resolve the relative addressed instruction is performed. As a result, only those pages that contain relative addressed instructions that are loaded into memory during program execution are actually resolved, thereby improving the performance of the computer.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Aspects of the present invention may be described in the general context of computer-executable instructions, such as program modules, being executed by a computer. Generally described, program modules include routines, programs, applications, widgets, objects, components, data structures, and the like that perform particular tasks or implement particular abstract data types. Moreover, the present invention may be implemented in distributed computing environments where tasks are performed by remote processing devices that are linked through a communications network. In a distributed computing environment, program modules may be located on local and/or remote computer storage media.

Figure 1:
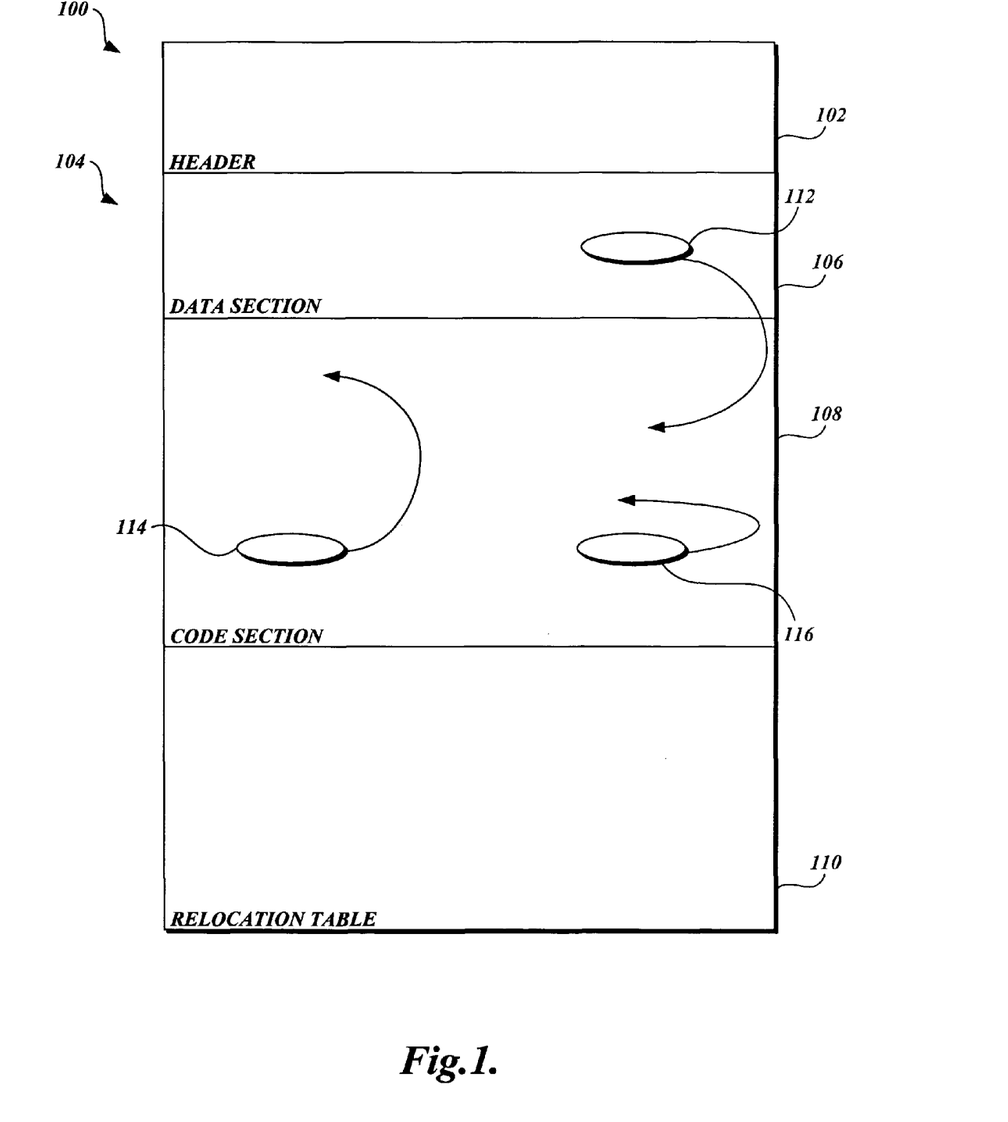
FIG. 1 depicts an exemplary executable image suitable to illustrate aspects of the present invention.

Now with reference to FIG. 1, the layout of an exemplary executable image 100 that may be used to illustrate aspects of the present invention will be described. As illustrated in FIG. 1, the executable image 100 consists of a header 102 and a body 104 that includes a data section 106, a code section 108, and a relocation table 110. Generally described, aspects of the present invention implement a memory management scheme that prevents malware from identifying the address space allocated to the executable image 100. In this regard, functionality is implemented to allocate address spaces in a way that is both randomized and does not have a prohibitive impact on system performance. While the executable image 100 is illustrated as having a layout with a header 102 and a body 104, those skilled in the art and others will recognize that this layout is exemplary as other types of executable images may adhere to a different format.

As used herein, the term "executable image" refers to any unit of program code that is in a format which may be executed by a CPU. For example, executable images can be found as a feature of the Microsoft Windows® family of operating systems having a particular extensions such as "DLL" (dynamically-linked-library), "EXE" (portable executable), and the like. These types of executable images have several characteristics. For example, they do not typically consume memory until used and because these types of executable images are stored in separate files, developers may update the images without affecting the operations of a calling program.

Generally stated, a page is the basic unit in which data in an executable image is loaded into memory ("paged-in") and freed when no longer needed. In this regard, data in the executable image 100 will typically be subdivided into "pages" with a predetermined and well-defined size by an operating system. The set of pages loaded into memory at a given point time may be referred to as a "page pool." These pages are tracked by a data structure commonly known as a "page table." The on demand paging mechanism implemented by modern computers may be utilized to make data available to the CPU when needed. However, those skilled in the art and others will recognize that the overhead processing required when paging data in and out of memory is relatively high when compared to other types of processing and should be completed in as efficient a way as possible.

Typically, a program developer assigns a "preferred base address" or ideal memory address where the executable image should be mapped into memory. When a program associated with the executable image 100 is launched, an operating system implements a layout process so that the executable image may be loaded into memory starting at the preferred base address. In traditional systems, the operating system may "hard-code" relative addressed instructions when the executable image 100 is being created, with the assumption that the image 100 will be loaded at the preferred base address. For example, as illustrated in FIG. 1, the executable image 100 contains the pointers 112, 114, and 116, each of which is a relative addressed instruction. Each of these relative addressed instructions reference a location that varies depending on where the executable image 100 is loaded. However, with traditional systems, the information hard-coded in the executable image 100 during layout is only correct if the executable image 100 is loaded in memory starting at the preferred base address.

Since the virtual memory address space available to all of the programs that may execute on a computer is limited, the preferred base address of the executable image 100 assigned by developers may have been previously assigned. In this instance, the preferred base address of the executable image 100 is said to "collide" with memory allocated to another program. When a collision occurs, the operating system has to reassign the executable image 100 a new base address in a process typically referred to as "re-basing." To handle the possibility of having to perform a re-basing, the operating system adds data to a data structure such as the relocation table 110 that identifies relative addressed instructions in the executable image 100 that will be modified if the executable image 100 is not loaded at its preferred base address.

Typically, a significant performance drawback is associated with performing a "re-basing" when the executable image 100 cannot be loaded at its preferred base address. For example, in traditional systems a re-basing is typically performed while a computer is in user mode. In this instance, all of the data in an executable image that contains a relative addressed instruction is read into memory and added to a backing store known as a "page file." Reading the entire executable image is expensive in terms of performance and may be unnecessary as some of the data in the executable image may not be needed during program execution. Moreover, when arithmetic operations that resolve relative addressed instructions are performed, pages in the executable image may be paged-in and paged-out of memory from the page file as needed. As a result, data in the executable image may have to be read from disparate and non-clustered locations on a mass storage device in a way that is expensive in terms of performing I/O. More specifically, performing I/O in this way results in a large amount of disk head movement and does not support sharing of pages for multiple instances of the same executable image 100.

In accordance with one aspect of the present invention, a memory management scheme is provided that prevents collisions on the same location in memory. To this end, software implemented by the present invention centrally manages the allocation of base addresses to executable images. Instead of a base address being established by a program developer, a component of the operating system allocates base addresses in a way that is safe (e.g., randomized), reliable, efficient, and allows pages in an executable image to be shared. To prevent a randomized allocation of preferred addresses from negatively impacting system performance, certain optimization that improve upon existing systems are implemented.

Figure 2:
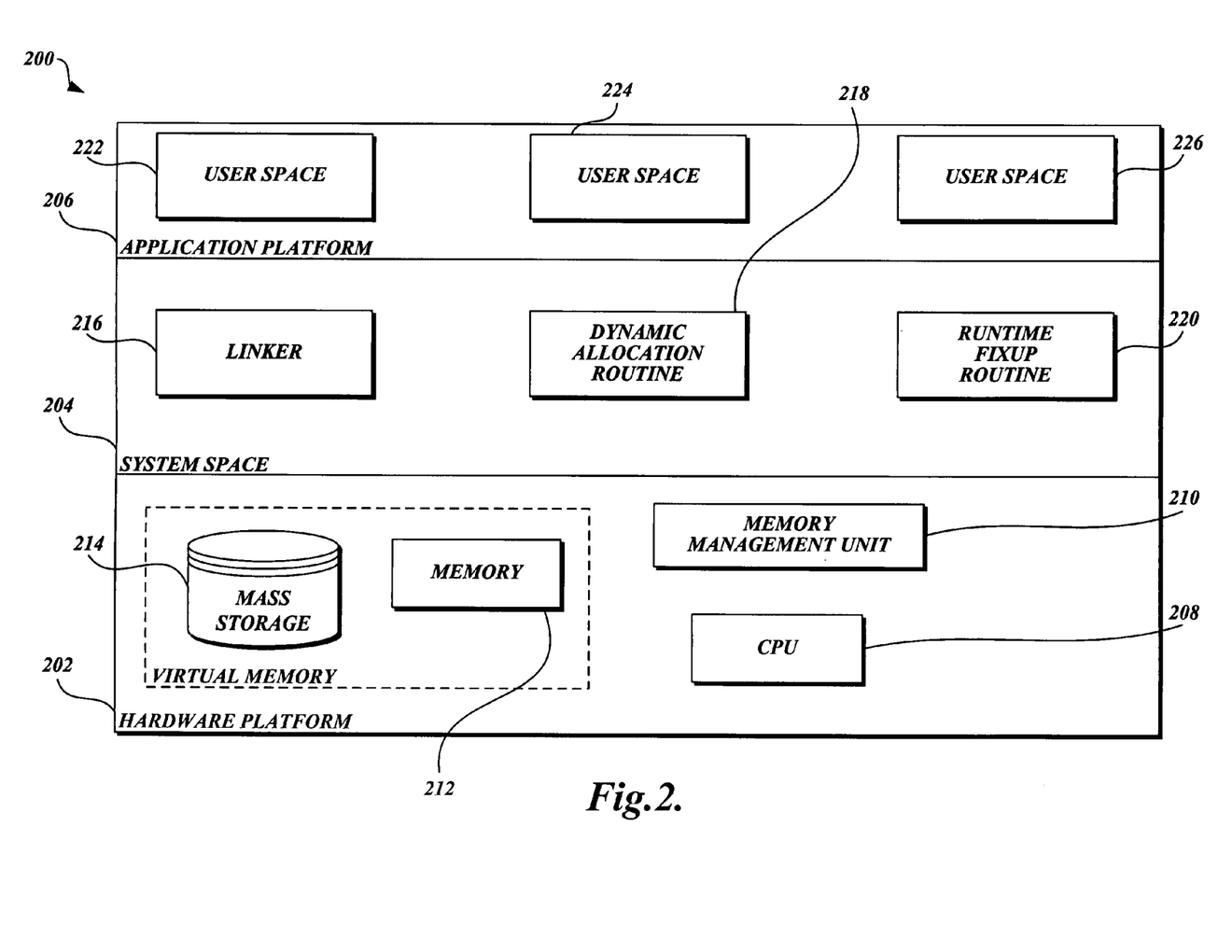
FIG. 2 is an exemplary computer in which aspects of the present invention may be implemented.

Now with reference to FIG. 2, a computer 200 in which aspect of the present invention may be implemented will be described. The computer 200 illustrated in FIG. 2 may be any one of a variety of devices including, but not limited to, personal computers, server-based computers, personal digital assistants, entertainment systems, set top boxes, cellular telephones, other electronic devices having some type of memory, and the like. For ease of illustration and because they are not important for an understanding of the present invention, FIG. 2 does not show the typical components of many computers such as a keyboard, a mouse, a printer or other I/O devices, a display, etc. However, the computer 200 illustrated in FIG. 2 includes a hardware platform 202, an operating system 204, and an application platform 206 on which programs may be executed. The hardware platform 202 illustrated in FIG. 2 includes a CPU 208, a memory management unit 210, memory 212, and mass storage 214. In this embodiment, the operating system 204 includes a linker 216, a dynamic allocation routine 218, and a runtime fixup routine 220. For ease of illustration and because it is not important for an understanding of the present invention, FIG. 2 is a highly simplified example that does not show many of the components that would be included in the computer 200.

The operating system 204 can be thought of as an interface between the application programs and the underlying hardware on the computer 200. The operating system 204 typically comprises various software routines that execute on the CPU 208 and that manage the physical components on the hardware platform 202 and their use by various application programs. In this regard, the operating system 204 illustrated in FIG. 2 includes the linker 216 that is responsible for creating an executable image such as the executable image 100 described above with reference to FIG. 1. In order to create an executable image, the linker 216 implements a layout process in which data from disparate sources is combined and translated into a format that may be executed. The linker 216 has been responsible for resolving relative addressed instructions when an executable image is created. In this regard, the linker 216 has traditionally caused every relative addressed instruction in an executable image to be hard-coded during image creation. However, hard-coding each memory reference when an image is created is inefficient as every page that stores a relative addressed instruction may not be accessed when the program is executed. As a result, with traditional systems, resource intensive operations are performed to resolve relative addressed instructions that may not be necessary. As described in further detail below, aspects of the dynamic allocation routine 218 and runtime fixup routine 220 cause relative addressed instructions to be resolved at runtime when a page is actually accessed. In this way, only those relative addressed instructions that are needed to execute the program are actually resolved.

Information used to resolve relative addressed instructions was typically stored in user space and accessed when the computer 200 was in "user mode." Those skilled in the art and others will recognize that modern computers are configured to serve multiple users with each user having a different user space such as the user spaces 222, 224, or 226 illustrated in FIG. 1. Measures are taken in these types of systems to prevent unauthorized users from accessing information that is associated with another user. In this regard, when information used to resolve relative addressed is stored in user space, multiple instances of potentially the same information may be resident in memory. Moreover, operations to resolve relative addressed instructions may be duplicatively performed for each instance of a program that is being executed. By contrast, information that is stored in system space may be shared by multiple users with the operating system kernel managing access to the shared pages. Aspects of the dynamic allocation routine 218 and runtime fixup routine 220 support a memory management scheme in which information used to resolve relative addressed instructions is stored in systems space and shared by multiple users. As a result, relative addressed instructions in an executable image accessible to different users may be resolved once and then made available to other users without the same relative addressed instructions being resolved multiple times. Moreover, aspects of the dynamic allocation routine 218 and runtime fixup routine 220 allow the same physical page that contains resolved instructions to be shared across multiple and concurrent instantiations of the executable image.

The memory management unit 210 is a hardware device or circuit that supports virtual memory and "on demand" paging by translating virtual addresses into physical addresses. In this regard, the memory management unit 210 handles the task of insuring that the necessary data is available to the CPU 208 so that program instructions may be executed. To that end, the memory management unit 210 supports the swapping of data between the mass storage 214, the memory 212, and one or more caches on the CPU 208. To track where data is physically stored, the memory management unit 210 contains a page table that is typically indexed by page number. Each page table entry gives a physical page number corresponding to a virtual page that is combined with a page offset to give a complete physical address. The page table may also include information about whether a page has been written to, when a page was last accessed, what kind of processes may read and write to the page, and the like. Those skilled in the art and others will recognize that fragmentation of virtual memory addresses results in a large number of page table entries and a corresponding inefficient use of other computer resources. For example, the CPU's translation lookaside buffer is less likely to contain needed entries when an excessive number of pages are used to track data in memory. As described in further detail below, aspects of the dynamic allocation routine 218 and the runtime fixup routine 220 promote a compact memory allocation scheme that minimizes the number of page table entries and associated page table pages that are used to track data in memory.

As illustrated in FIG. 2, the operating system 204 includes a dynamic allocation routine 218 and a runtime fixup routine 220. Since the dynamic allocation routine 218 and the runtime fixup routine 220 are described in detail below with reference to FIGS. 3 and 5, respectively, a detailed description of these routines will not be provided here. However, generally described, the routines 218 and 220 implement a memory management scheme that inhibits malware authors from being able to identify the memory allocated to an executable image. Moreover, these routines implement functionality that enables an operating system to serve as a central authority allocating address spaces to executable images in a way that prevents collisions. In this regard and by way of example only, the dynamic allocation routine 218 and runtime fixup routine 220 implement a memory management scheme that (1) allocates a base address to an executable image using a randomized seed; (2) causes information that is used to resolve relative addressed instructions in executable images to be loaded in system space so that the information may be shared; (3) resolves relative addressed instructions in an executable image at runtime; (4) causes executable images to be compactly loaded into memory, and (5) efficiently obtains image data so that performance inhibiting I/Os operations do not occur when an image is created. As a result, the memory management scheme implemented by the present invention inhibits attempts by malware to use an executable image as a mechanism to gain control of the computer.

Now with reference to FIG. 3, an exemplary dynamic allocation routine 218 mentioned briefly above with reference to FIG. 2 will be described in more detail. As a preliminary matter, the dynamic allocation routine 218 is configured to allocate base addresses to executable images in a way that promotes a compact and efficient use of memory. As a result, a smaller number of page table entries and there associated page table pages are used to perform memory management functions when compared to traditional systems. Moreover, a compact and efficient use of memory as implemented by the dynamic allocation routine 218 that provides larger areas of contiguous virtual address space for programs to utilize when compared to traditional systems. Finally, the dynamic allocation routine 218 performs actions that enable the runtime fixup routine 220 (FIG. 5) to resolve relative addressed instructions at runtime.

Figure 3:
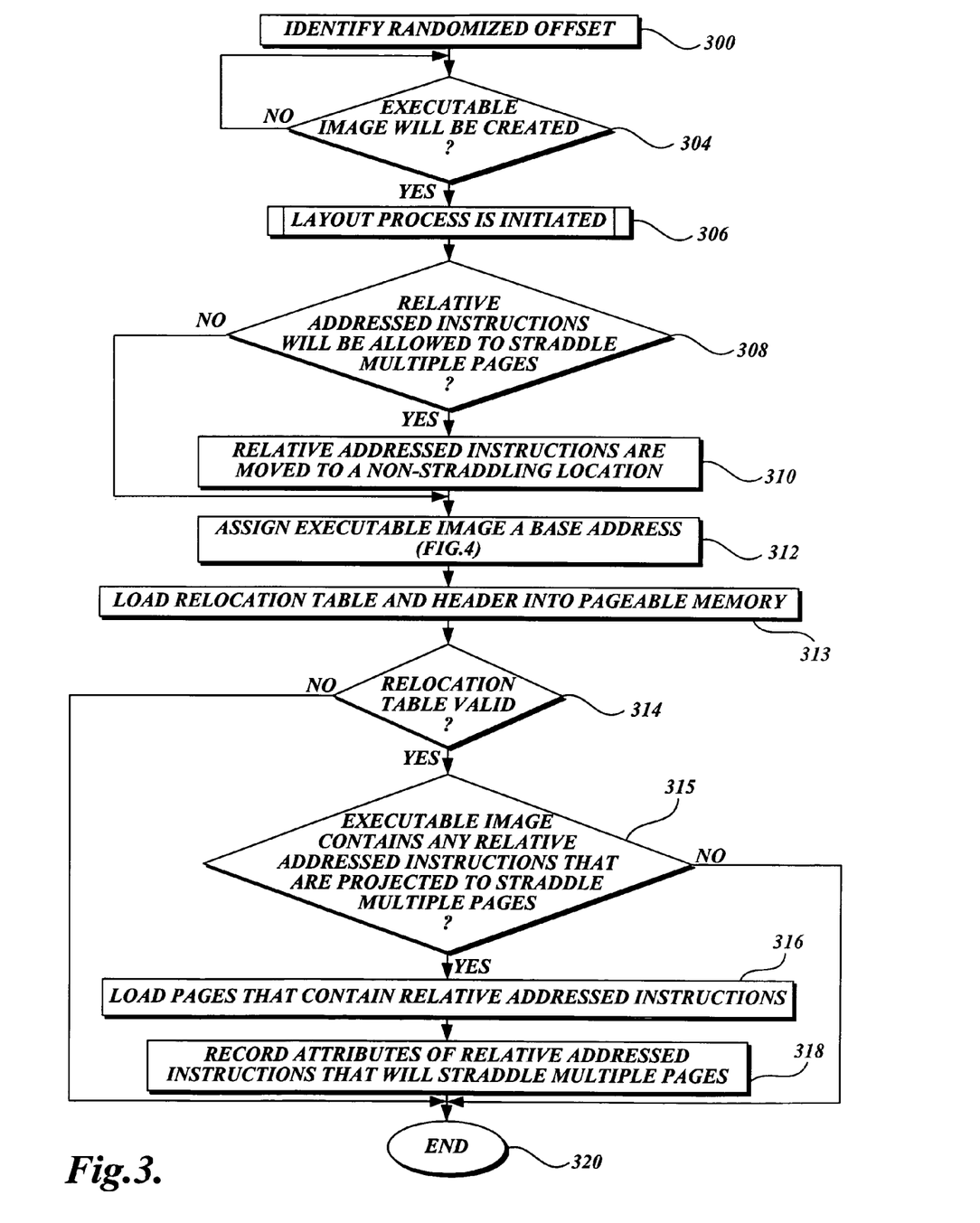
FIG. 3 depicts an exemplary allocation routine that assigns a randomized address to executable images in accordance with one embodiment of the present invention.

As illustrated in FIG. 3, the dynamic allocation routine 218 begins at block 300 where a randomized offset is identified. In one embodiment, the randomized offset is identified by reading a CPU "time stamp" that varies each time a computer is booted. As described in further detail below, the randomized offset identified by reading a time stamp associated with a CPU may be used as a multiplier to identify a randomized "seed" into a memory address space. While the dynamic allocation routine 218 is described as identifying a randomized offset from a time stamp associated with a CPU, those skilled in the art and others will recognize that other techniques may be used to identify a random offset.

To avoid the overhead of reading data used to create executable images into memory when a program is launched, modern operating systems may pre-fetch "data sections" of a program. For example, if a program is commonly used, an operating system may load all of the data that is needed to create an executable image of the program at computer startup or sometime thereafter. Then, when the program is launched, this data is readily available and the executable image may be created without I/O operations to a mass storage device having to be performed. As described in further detail below, aspects of the present invention may also leverage the pre-fetching performed by a computer operating system to prevent performance-inhibiting I/O operations from occurring.

At block 304, the dynamic allocation routine 218 remains idle until a determination is made that an executable image will be created. In accordance with one embodiment, aspects of the present invention perform processing in conjunction with an operating system linker to create an executable image. In any event, an executable image is typically created when a user generates input directed at causing a program to be launched. For example, a user may double-click on an icon associated with a program to launch a word processing program, spreadsheet program, and the like. However, those skilled in the art and others will recognize that a program may be launched and an executable image created in other instances without departing from the scope of the claimed subject matter. For example, programs may be launched automatically when a program is included in an auto start extensibility point ("ASEP").

As illustrated in FIG. 3, at block 306, a layout process designed to create an executable image is initiated. Since certain aspects of layout process are beyond the scope of the claimed subject matter they will not be described in detail here. However, aspects of the present invention may modify the way in which layout is performed so that, among other things, relative addressed instructions may be resolved at runtime. In this regard, those skilled in the art and others will recognize that a relative addressed instruction may "straddle" multiple pages in memory so that portions of the instruction are stored on different pages. In traditional systems, resolving a relative addressed instruction that straddles multiple pages included (1) contiguously loading an executable image including each page that stores a portion of the relative addressed instruction at image creation time; (2) reading data from each page that stores a portion of a relative addressed instruction; (3) performing an arithmetic operation that resolves the relative addressed instruction; and (4) writing data to the pages that store a portion of the relative addressed instruction that reflects the results of the arithmetic operation.

In contrast to traditional systems, aspects of the present invention resolve relative addressed instructions at runtime when a page is actually accessed. Unfortunately, deadlock situations in which forward progress is not made could arise if measures are not taken in a memory management scheme that resolves relative addressed instructions at runtime. More specifically, sufficient memory may not be available at runtime for each of the pages that store a portion of a relative addressed instruction. For example, when a first page that stores a portion of a relative addressed instruction is accessed, a request for information from a second page that stores another portion of the relative addressed instruction may be issued. However, the first page may have to be "paged-out" so that sufficient memory is available for the second page to be "paged-in." Since the relative addressed instruction can't be resolved without the data from the first page being available from memory, a request is generated to access data from the first page. In turn, this leads to a cycle in which forward progress is not made. As described in further detail below, aspects of the present invention may modify the layout process in a way that prevents a deadlock from occurring so that relative addressed instructions may be resolved at runtime.

As illustrated in FIG. 3, at decision block 308, a determination is made regarding whether relative addressed instructions in an executable image will be allowed to straddle multiple pages. Depending on the capabilities of the computer, different embodiments of the present invention are provided to prevent deadlocks and improve system performance. More specifically, in one embodiment that will typically be implemented in non-legacy versions of a program, relative addressed instructions are prevented from straddling multiple pages. In this instance, the dynamic allocation routine 218 determines that the result of the test performed at block 308 is "YES" and proceeds to block 310. Conversely, some computers may have legacy versions of an executable image with relative addressed instructions that cannot be prevented from straddling multiple pages. In this instance, the dynamic allocation routine 218 determines that the result of the test performed at block 308 is "NO" and proceeds to block 312, described in further detail below.

At block 310, the location of each relative addressed instruction(s) in an executable image that is projected to straddle a page boundary is moved to a non-straddling location. As mentioned previously, aspects of the present invention may perform processing during a layout process when an executable image is being created. In this regard, when a relative addressed instruction is encountered during layout, a determination is made on whether the relative addressed instruction is projected to straddle a page boundary. This determination may be made by comparing the memory locations of known page boundaries with the range of memory that the relative addressed instruction is projected to occupy. If a page boundary falls within the range of memory that a relative addressed instruction is projected to occupy, the relative addressed instruction is projected to straddle multiple pages. In this instance, the dynamic allocation routine 218 adds "padding" to the executable image so that the relative addressed instruction will not straddle a page boundary. In other words, the relative addressed instruction is moved inside an executable image so that the location where the instruction is scheduled to be loaded into memory will not be stored on multiple pages. Then, the dynamic allocation routine 218 proceeds to block 312, described in further detail below.

As illustrated in FIG. 3, at block 312, the dynamic allocation routine 218 assigns a base address to the executable image that is being created. As mentioned previously, aspects of the present invention centrally manage the allocation of memory so that, among other things, memory may be allocated in a way that is both safe from malware exploits and promotes efficiency. Stated differently, a preferred base address defined by developers in the header of an executable image is not used by aspects of the present invention. Instead, a base address is identified at block 312 by performing a lookup in a data structure managed by the kernel of an operating system that dynamically tracks the allocation of memory to a plurality of active executable images.

Figure 4:
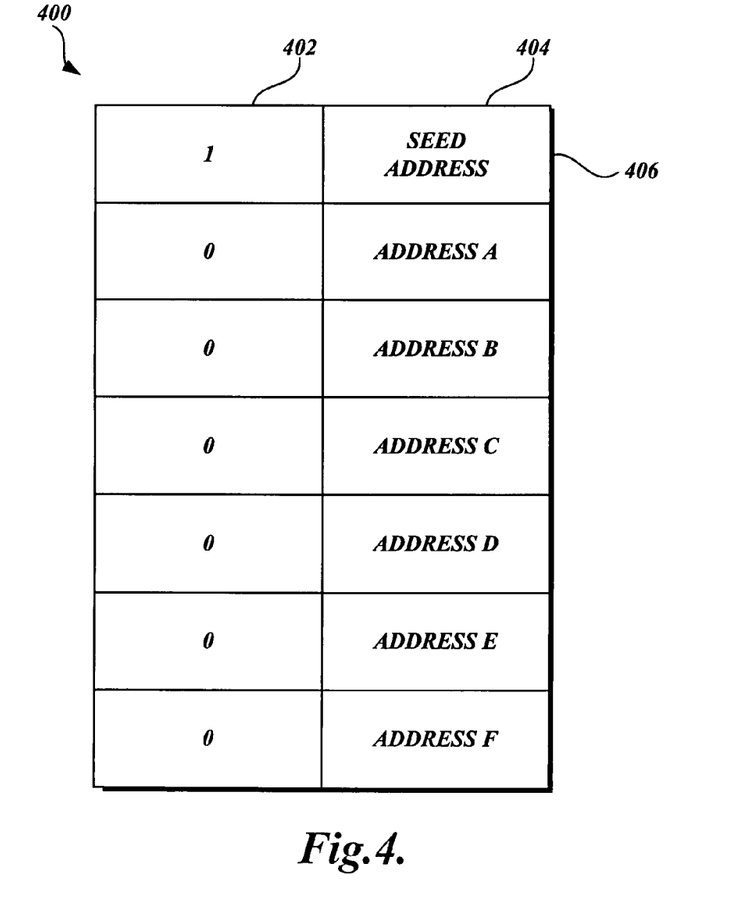
FIG. 4 illustrates an exemplary bitmap that may be used to track the allocation of base addresses to executable images in accordance with another embodiment of the present invention.

Now with reference to FIG. 4, an exemplary bitmap 400 that may be used to assign and track the allocation of base addresses in accordance with one embodiment of the present invention will be described. The dynamic allocation routine 218 may access the exemplary bitmap 400 at block 312 for the purpose of obtaining a next available base address. In this regard, the bitmap 400 maintains an allocated row 402 and a base address row 404. The first entry 404 in the base address row 404 is a randomized "seed" that is calculated using the offset identified by the dynamic allocation routine 218 at block 300. The randomized offset is multiplied with a value capable of identifying a valid memory address that is assigned to a first-in-time executable image. Each time the computer boots a new randomized seed is calculated and recorded as the first entry 404 in the base address row 404. Once the seed has been allocated, the appropriate "bit" in the allocated row 402 is set to indicate that this memory address space is occupied.

Each successive executable image is assigned a base address that is equal to the previously assigned base address plus a value that accounts for the memory address space occupied by other executable images. When memory allocated to an executable image is freed, the appropriate "bit" in the allocated row 402 is set to indicate that the corresponding address space may be assigned to a different executable image.

Generally described, the exemplary bitmap 400 provides a fast way to identify a memory address space that is available for allocation to an executable image. Moreover, the bitmap 400 allocates base addresses in a way that is both randomized and causes the images to be compactly loaded into memory. As mentioned previously, a data structure commonly known as page table is used to track pages loaded in memory. Fragmentation of executable images over a given memory address space results in inefficient use of resources as each page in the page table tracks a contiguous area of memory. In other words, a larger number of pages table pages are required to track the same amount of data when executable images are not compactly loaded into memory. Also, the CPU's translation lookaside buffer is less likely to contain certain entries when an excessive number of pages are used to track data in memory. By causing data to be loaded over a contiguous address space starting at a random seed, aspects of the present invention inhibit malware authors while maximizing the use of computer resources.

At block 313, a copy of the header and relocation table associated with the executable image being created is loaded into memory ("the page pool"). As mentioned previously, the header of the executable image contains a preferred base address established by program developers. Moreover, a relocation table provides the information used to "re-base" relative addressed instructions in an executable image if the executable image is not loaded at the preferred base address. In traditional systems, the relocation table was not necessarily loaded and maintained in the page pool in anticipation of program execution. As a result, the relocation table may have been repeatedly accessed from mass storage on a local or remote computer. Unfortunately, by repeatedly accessing the relocation table from mass storage, malware is given a greater opportunity to modify the relocation table and cause program execution to be re-directed. Thus, aspects of the present invention load and maintain a version of the header and relocation table in the page pool, thereby limiting access to this data. Moreover, aspects of the present invention load and maintain a version of the header and relocation table in "system space" so that relative addressed instructions may be resolved once and made available to other users.

Data accessed by aspects of the present invention, including an executable image's header and relocation table, may be obtained from a program's "data section" that is pre-fetched by an operating system. Since a program's data section is pre-fetched at computer startup, this information may be cached in memory even before a program associated with the executable image is launched. As described in further detail below with reference to block 318, this caching of data reduces the number of read operations to a mass storage device that are performed when an image is created. Thus, while the dynamic allocation routine 218 is depicted as causing the header and relocation table to be loaded into memory at block 313, it is anticipated that this step may be performed at a different point in time without departing from the scope of the claimed subject matter.

At block 314, a determination is made regarding whether the relocation table loaded into memory at block 313 is valid. As mentioned previously, malware may attempt to modify the contents of the relocation table in order to redirect program execution to an external location. Thus, to determine whether the relocation table is valid, the dynamic allocation routine 218 identifies whether any entries in the relocation table reference an invalid location such as a location that is outside of the memory address space that may be allocated to the executable image. If a determination is made at block 314 that the relocation table is not valid, then the dynamic allocation routine 218 proceeds to block 320 where it terminates. In this instance, existing systems may be notified that data potentially characteristic of malware was identified so that a malware infection may be handled. Conversely, if a determination is made that the relocation table is valid, the dynamic allocation routine 218 proceeds to block 315.

As illustrated in FIG. 3, at block 315, a determination is made regarding whether the executable image contains any relative addressed instructions that are projected to straddle multiple pages. As mentioned previously and in accordance with one embodiment of the present invention, an executable image is modified so that relative addressed instructions are prevented from straddling multiple pages. In another embodiment, relative addressed instructions are allowed to straddle multiple pages. However, in this instance, processing is performed by the dynamic allocation routine 218 to insure that forward progress is made when a straddling relative addressed instruction is resolved at runtime. Similar to the description provided above with reference to block 310, relative addressed instructions that are projected to straddle multiple pages may be identified at block 315 by comparing the memory locations of known page boundaries with the range of memory that a relative addressed instruction is projected to occupy. If a page boundary falls within a range that a relative addressed instruction is projected to occupy, a determination is made that the relative addressed instruction will straddle multiple pages and the dynamic allocation routine 218 proceeds to block 316. Conversely, if there are not any relative addressed instructions that are projected to straddle page boundary, the dynamic allocation routine 218 proceeds to block 320, where it terminates.

If block 316 is reached, a relative addressed instruction in an executable that is projected to straddle multiple pages was identified. In this instance, pages that contain portions of the straddling relative addressed instruction are identified and loaded into memory at block 316. As described in further detail below, the dynamic allocation routine 218 records a set of information using information derived from these pages so that relative addressed instructions that straddle multiple pages may be resolved at runtime. In any event, pages that store portions of a relative addressed instruction may be accessed when those pages are loaded into memory.

As mentioned previously, modern operating systems may pre-fetch section data associated with a program at computer startup or sometime thereafter for the purpose of avoiding the overhead of having to read data from a mass storage device when a program is launched. The pre-fetching performed by an operating system may be leveraged by aspects of the present invention to prevent I/O operations to a mass storage device from being performed. For example, the dynamic allocation routine 218 accesses data in a relocation table and/or pages that are projected to contain at least a portion of a relative addressed instruction. In traditional systems, read requests for "image data" were issued to obtain this type of information. These requests could generate a page fault that would eventually cause the requested information to be read from a mass storage device. In accordance with one embodiment, when information associated with a program is needed and the information is not readily available as image data, a check is performed to determine whether the information is available as section data. If the information is available as section data, an I/O operation to a mass storage device is avoided. Moreover, since section data may be pre-fetched at computer startup, information accessed by aspects of the present invention may be cached in memory even before a program associated with the executable image is launched. Thus, while the dynamic allocation routine 218 is depicted as causing the header, relocation table, and pages with relative addressed instruction to be loaded in memory during image creation, this information may, and typically will, be loaded into memory before an image is created. As a result, processing performed by aspects of the present invention may enable dynamic relocations of an executable without having a performance impact.

At block 318, information describing the attributes of relative addressed instructions that will straddle multiple pages is recorded in a data structure. If block 318 is reached, at least one relative addressed instruction that is projected to straddle a page boundary was identified. To minimize the number of page faults that occur at runtime and prevent deadlocks, the dynamic allocation routine 218 records attributes of these relative addressed instructions in an addendum to the relocation table. For each page loaded into memory at block 316, information that describes attributes of the relative addressed instruction on the page is added to the addendum. By recording this information during image creation, all of the pages that store portions of the relative addressed instruction do not have to be loaded into memory at runtime. Instead, a lookup in the addendum may be performed when information about an instruction is needed from a page that is "paged-out." Then, the dynamic allocation routine 218 proceeds to block 320, where it terminates. Once the processing performed by the dynamic allocation routine 218 completes, existing systems may execute program code associated with the executable image. As described in further detail below with reference to FIG. 5, aspects of the present invention resolve relative addressed instructions in the executable image at runtime. As a result, only relative addressed instructions on pages actually accessed during program execution are resolved.

Figure 5:
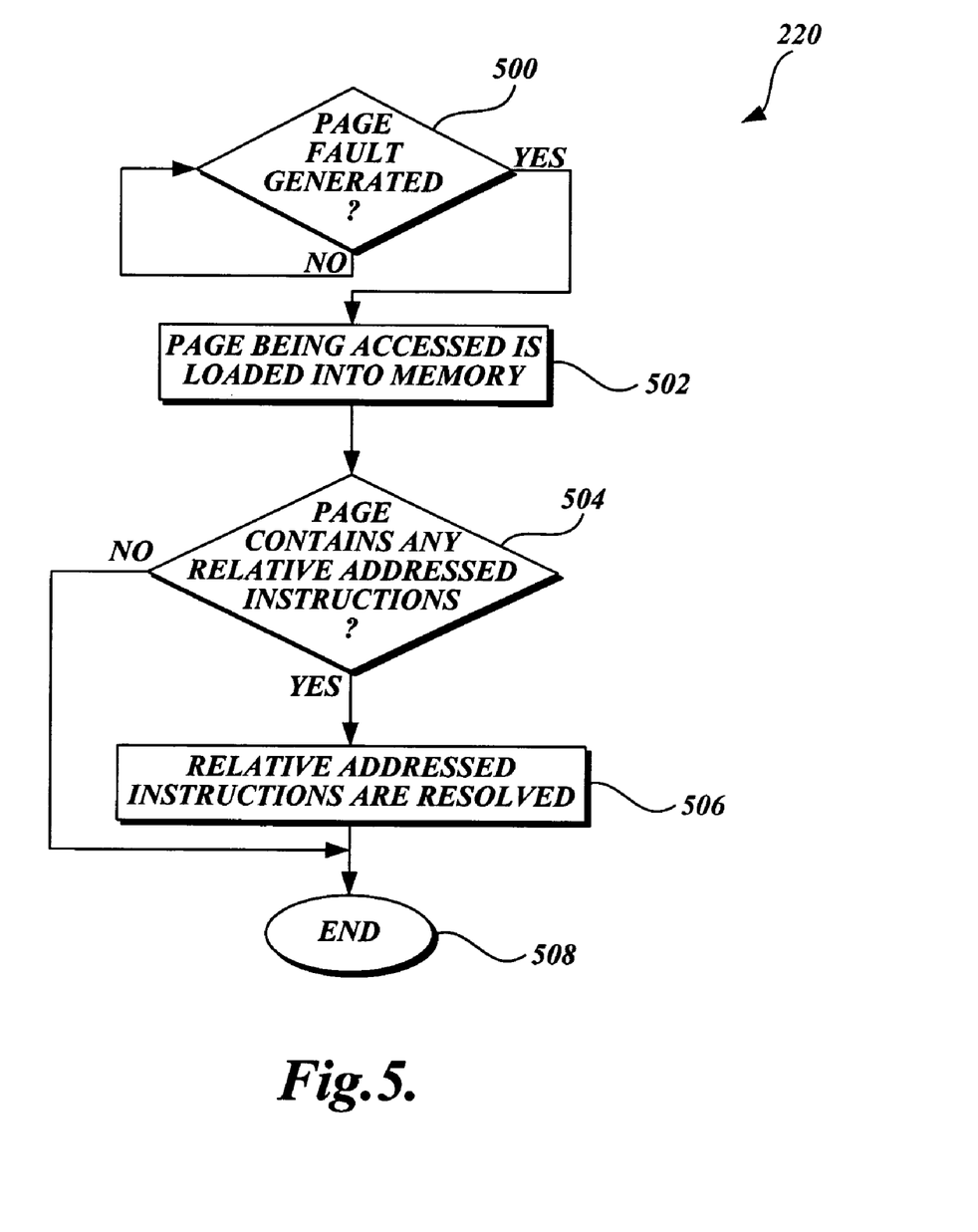
FIG. 5 illustrates an exemplary runtime fixup routine that resolves relative address instructions at runtime in accordance with another embodiment of the present invention.

Now with reference to FIG. 5, an exemplary runtime fixup routine 220 mentioned briefly above with reference to FIG. 2 will be described in more detail. As illustrated in FIG. 5, the runtime fixup routine 220 begins at block 500 where it remains idle until a page fault that will cause a page to be loaded into memory is generated. Those skilled in the art and others will recognize that modern computers implement a system commonly known as demand paging in which a page is copied into memory only if an attempt is made to access the page. In instances when an attempt to access a page occurs, a page fault is generated and the process of copying the page into memory is initiated. More specifically, once the page fault is generated at block 500, the runtime fixup routine 220 proceeds to block 502, where the page is loaded into memory. Significantly, in operating systems that support demand paging, pages that are not accessed are not loaded into memory.

As illustrated in FIG. 5, at block 504, a determination is made regarding whether the page loaded into memory at block 502 contains any relative addressed instructions. As mentioned previously, a component of an executable image known as a relocation table contains entries that identify the relative addressed instructions in the executable image. Thus, an entry in an executable image's relocation table may reference data on the page loaded in memory at block 502. In this instance, the runtime fixup routine 220 determines that the result of the test performed at block is "YES" and proceeds to block 506, described in further detail below. Conversely, if the relocation table does not have an entry associated with the page loaded in memory at block 502, a determination is made that the page does not contain a relative addressed instruction and the runtime fixup routine 220 proceeds to block 508, where it terminates.

At block 506, the relative addressed instruction(s) on the page loaded into memory at block 502 are resolved. More specifically, an arithmetic operation is performed for each relative addressed instruction on the page loaded in memory at block 502. The arithmetic operation uses offset information in the relocation table to identify the actual memory location that stores the data item referenced in relative addressed instruction. In instances when a relative addressed instruction straddles multiple pages, the runtime fixup routine 220 also performs a lookup in the addendum to the relocation table. As described previously with reference to FIG. 3, information added in an addendum to the relocation table may be used to resolve a relative addressed instruction that straddles multiple pages without each page that contains a portion of the relative addressed instruction being loaded in memory.

Those skilled in the art and others will recognize that resolving a relative addressed instruction includes "writing" data to the page in memory. Moreover, some operating systems implement a "copy on write" optimization strategy in which an initially indistinguishable resource (e.g., page) is shared by multiple users. To implement this strategy, pointers to the same page are provided as long as the page is not modified. Once a page is marked as modified, the operating system provides a private copy of the page to the calling user so that modifications may not be accessed by other users. However, a modification made to a page by aspects of the present invention is performed without marking the page as modified. As a result, the page may be shared without operations to resolve the relative addressed instructions being repetitively performed. While not marking a page as modified may allow the page to be "paged-out" with the modifications performed by the runtime fixup routine 220 being lost, these modifications may be performed more quickly than a "copy on write" operation in which data may be read from a mass storage device. Moreover, by resolving relative addressed instructions without marking pages as modified, a high performance I/O path is maintained since an executable image's pages may continue to be read contiguously as a large cluster of data from a file system. Without this mechanism, a disk head is required to move to a page file where small and fragmented I/O operations are performed. Performing contiguous I/O operations as implemented by the present invention is more efficient than having to perform small and fragmented I/O. Then the runtime fixup routine 220 proceeds to block 508, where it terminates.

While illustrative embodiments have been illustrated and described, it will be appreciated that various changes can be made therein without departing from the spirit and scope of the invention.

The embodiments of the invention in which an exclusive property or privilege is claimed are defined as follows:

1. In a computer configured to load pages of data from an executable image into a memory, a method of resolving a relative addressed instruction in the executable image at runtime, the method comprising:

identifying a randomized location to load the executable image into the memory at least in part by calculating an offset of the executable image, calculating the offset comprising at least in part reading a CPU time stamp that varies each time the computer is booted, the randomized location being based on a seed that causes data to be loaded over a contiguous area of the memory;

loading and maintaining data used to resolve the relative addressed instruction in the memory; and in response to a page that stores the relative addressed instruction being loaded into the memory at runtime, performing an arithmetic operation to resolve the relative addressed instruction.

2. The method as recited in claim 1, wherein the relative addressed instruction is resolved without marking the page that stores the relative addressed instruction as modified.

3. The method as recited in claim 1, wherein the relative addressed instruction is resolved in a way that allows clustered I/O to be performed when the executable image is accessed without causing data to be obtained from a page file.

4. The method as recited in claim 1, wherein the relative addressed instruction is resolved without hard coding data into the executable image during image creation.

5. The method as recited in claim 1, wherein the arithmetic operation that resolves the relative addressed instruction is performed when the computer is in kernel mode.

6. The method as recited in claim 5, wherein the page that stores the relative addressed instruction is shared between multiple instances of the executable image.

7. The method as recited in claim 1, wherein only those relative addressed instructions that are on the page that is accessed during program execution are resolved.

8. The method as recited in claim 1, wherein the randomized location where the executable image is loaded is identified by a component of an operating system that centrally manages the allocation of base addresses; and wherein the executable image is prevented from colliding with other data in the memory.

9. The method as recited in claim 1, wherein the data used to resolve the relative addressed instruction includes a relocation table that is prefetched from a program's data section.

10. The method as recited in claim 9, wherein loading and maintaining data used to resolve the relative addressed instruction in the memory includes:

determining whether the relative addressed instruction in the executable image will straddle multiple pages;

if the relative addressed instruction will not straddle multiple pages, moving the relative addressed instruction to a non-straddling location; and if the relative addressed instruction will straddle multiple pages, recording information that describes attributes of the relative addressed instruction in an addendum to the relocation table.

11. The method as recited in claim 10, further comprising if the relative addressed instruction will straddle multiple pages, using information available from the addendum to the relocation table to resolve the relative addressed instruction without causing each page that contains a portion of the relative addressed instruction to be loaded in the memory at runtime.

12. A computer-readable storage medium containing computer-readable instructions which, when executed in a computer with an operating system that supports on demand paging, performs a method comprising:

prefetching a relocation table associated with a program before the executable image is created, the relocation table being maintained in a memory during program execution;

determining whether relative addressed instructions in the executable image will straddle multiple pages;

if the relative addressed instructions in the executable image will not straddle multiple pages, moving the relative addressed instructions to a non-straddling location; and if the relative addressed instructions in the executable image will straddle multiple pages, recording, in the relocation table, information that describes attributes of the relative addressed instructions, the relative addressed instructions being resolved when the computer is in kernel mode, and pages that store the relative addressed instructions being accessed without being marked as modified.

13. The computer-readable storage medium as recited in claim 12, wherein the method further comprises:

if the relative addressed instructions in the executable image will straddle multiple pages, using the recorded information to resolve the relative addressed instructions at runtime without each page that contains a portion of the relative addressed instructions being loaded in memory; and if the relative addressed instructions in the executable image will not straddle multiple pages, using information in the relocation table to resolve the relative addressed instructions at runtime.

14. The computer-readable storage medium as recited in claim 12, wherein pages of physical memory that store the relative addressed instructions are shared by multiple instances of the executable image.

15. The computer-readable storage medium as recited in claim 12, wherein the information that describes attributes of the relative addressed instructions is obtained from pages prefetched before the executable image is created.

16. The computer-readable storage medium as recited in claim 12, wherein prefetching a relocation table associated with a program before the executable image is created includes determining whether any entries in the relocation table reference an invalid location.

17. A computer-readable storage medium having computer executable components for allocating a memory address space to executable images, comprising:

a run-time component operative to resolve relative addressed instructions in the executable images at runtime when a computer is in kernel mode, the run-time component further operative to access pages that store the relative addressed instructions without marking the pages as modified;

an allocation component that:

allocates base addresses to the executable images to cause the executable images to be loaded over a contiguous address space;

causes data used by the run-time component to be loaded in a system space at a shared location;

an optimization component operative to prefetch data used by the run-time component to resolve relative addressed instructions before the executable images are created.

18. The computer-readable storage medium as recited in claim 17, wherein the allocation component is further configured to:

determine whether relative addressed instructions in the executable images are projected to straddle multiple pages; and if relative addressed instructions in the executable images are projected to straddle multiple pages, move the relative addressed instructions to a non-straddling location.

* * * * *